US012475652B2

(12) United States Patent
Norieda et al.

(10) Patent No.: US 12,475,652 B2
(45) Date of Patent: Nov. 18, 2025

(54) VIRTUAL SPACE PROVIDING DEVICE, VIRTUAL SPACE PROVIDING METHOD, AND COMPUTER-READABLE STORAGE MEDIUM

(71) Applicant: NEC Corporation, Tokyo (JP)

(72) Inventors: Shin Norieda, Tokyo (JP); Kenta Fukuoka, Tokyo (JP); Yoshiyuki Tanaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/685,017

(22) PCT Filed: Sep. 3, 2021

(86) PCT No.: PCT/JP2021/032507
§ 371 (c)(1),
(2) Date: Feb. 20, 2024

(87) PCT Pub. No.: WO2023/032173
PCT Pub. Date: Mar. 9, 2023

(65) Prior Publication Data
US 2025/0131654 A1    Apr. 24, 2025

(51) Int. Cl.
*G06T 19/00* (2011.01)
*G06F 3/01* (2006.01)

(52) U.S. Cl.
CPC .............. *G06T 19/00* (2013.01); *G06F 3/012* (2013.01); *G06F 3/013* (2013.01);
(Continued)

(58) Field of Classification Search
CPC .......... G06F 3/013; G06F 3/012; G06F 3/011; G02B 27/0172; G02B 27/0093;
(Continued)

(56) References Cited

U.S. PATENT DOCUMENTS 10,719,127 B1 * 7/2020 Keith ................... G09G 3/3208
2009/0015679 A1 * 1/2009 Hayakawa ............. G06T 13/20
348/207.1
(Continued)

FOREIGN PATENT DOCUMENTS

JP    2005-018212 A    1/2005
JP    2009-123001 A    6/2009
(Continued)

OTHER PUBLICATIONS

International Search Report for PCT Application No. PCT/JP2021/032507, mailed on Oct. 19, 2021.
(Continued)

*Primary Examiner* — Koosha Sharifi-Tafreshi
(74) *Attorney, Agent, or Firm* — Sughrue Mion, PLLC

(57) ABSTRACT

Provided are a virtual space provision device and the like capable of more accurately estimating the line of sight of a user who uses an avatar to use a virtual space. A virtual space provision device according to an embodiment of the present disclosure is provided with: a detection unit that detects the orientation of an avatar in a virtual space, the orientation of the avatar changing in response to a user's operation; an output control unit that performs control to output, to the user, an output image which corresponds to the orientation of the avatar in the virtual space, and in which the display mode of the outside of a prescribed region has been changed; and an estimation unit that estimates the line of sight of the user on the basis of the prescribed region in the output image.

18 Claims, 15 Drawing Sheets

(52) U.S. Cl.
    CPC .... *G06F 2203/011* (2013.01); *G06T 2200/24* (2013.01); *G06T 2219/024* (2013.01)

(58) Field of Classification Search
    CPC ...... G02B 2027/0178; G02B 2027/014; G02B 2027/0138; G02B 27/017; G02B 2027/0187; G06T 5/70; G06T 19/006; G06T 5/73; G06T 15/20; H04N 23/67
    See application file for complete search history.

(56) References Cited

U.S. PATENT DOCUMENTS

| | | | | |
|---|---|---|---|---|
| 2011/0190059 | A1* | 8/2011 | Otani | A63F 13/10 463/36 |
| 2012/0272179 | A1* | 10/2012 | Stafford | G06F 3/0482 345/157 |
| 2018/0061084 | A1* | 3/2018 | Mitchell | G06T 13/00 |
| 2018/0188534 | A1* | 7/2018 | Stafford | G02B 27/0093 |
| 2018/0373328 | A1* | 12/2018 | Sawaki | G02B 27/017 |
| 2022/0237849 | A1* | 7/2022 | Lindh | G06T 13/40 |

FOREIGN PATENT DOCUMENTS

| | | |
|---|---|---|
| JP | 2019-128683 A | 8/2019 |
| JP | 2019-193697 A | 11/2019 |
| JP | 2020-004060 A | 1/2020 |
| JP | 2021-021889 A | 2/2021 |
| JP | 2021-507355 A | 2/2021 |
| WO | 2020/217326 A1 | 10/2020 |
| WO | 2020/250377 A1 | 12/2020 |
| WO | 2021/153577 A1 | 8/2021 |

OTHER PUBLICATIONS

English translation of Written opinion for PCT Application No. PCT/JP2021/032507, mailed on Oct. 19, 2021.

Kaoru Tanaka, visual information tracking system using HMD with limited field of view, [online], 2002, pp. 257 to 266, https://www.jstage.jst.go.jp/article/tvrsj/7/2/7_KJ00007553778/_article/-char/ja/, [Search date: Oct. 8, 2021].

JP Office Action for JP Application No. 2023-544953, mailed on Mar. 18, 2025 with English Translation.

Matsumura et al., "Team Sports Situation Grasping Skill Fostering Support System by Eye Movement Detection Using AR and HMD", Proceedings of the 80th National Convention of the Information Processing Society of Japan, Mar. 13, 2018, The Information Processing Society ofJapan, vol. 2018, No. 1, pp. 753-754.

* cited by examiner

VIRTUAL SPACE PROVIDING DEVICE, VIRTUAL SPACE PROVIDING METHOD, AND COMPUTER-READABLE STORAGE MEDIUM

This application is a National Stage Entry of PCT/JP2021/032507 filed on Sep. 3, 2021, the contents of all of which are incorporated herein by reference, in their entirety.

TECHNICAL FIELD

The present disclosure relates to a technique for controlling a virtual space.

BACKGROUND ART

There is a technique for a plurality of users to communicate with each other in a virtual space. For example, PTLs 1 and 2 disclose a technique of displaying a three-dimensional virtual space and allowing a user to freely move in the three-dimensional virtual space or communicate with another user by operating an avatar.

CITATION LIST

Patent Literature

PTL 1: JP 2009-123001 A
PTL 2: JP 2005-018212 A

SUMMARY OF INVENTION

Technical Problem

When checking a person's appearance in a real space, information on the person's line of sight may be used. On the other hand, in the virtual space described above, since an avatar operated by a person appears, there is a possibility that what the person (that is, the user operating the avatar) is looking at is unknown.

In this regard, PTLs 1 and 2 describe that a line is drawn in the line-of-sight direction of an avatar and an object that collides first with the line is specified as an object pointed to by the user. Here, in an image showing a virtual space displayed for the user, not only the object ahead of the line of sight of the avatar but also surrounding objects may be shown. Therefore, the user does not necessarily look at the object ahead of the line of sight of the avatar. In this regard, there is room for improvement.

The present disclosure has been made in view of the above-mentioned problems, and it is an object of the present disclosure to provide a virtual space providing device and the like capable of more accurately estimating the line of sight of a user who uses a virtual space using an avatar.

Solution to Problem

A virtual space providing device according to an aspect of the present disclosure includes a detection means for detecting a direction of an avatar in a virtual space, the direction of which changes according to a user's operation, an output control means for performing control to output to the user an output image that is an image according to the direction of the avatar in the virtual space and in which a display mode of an outside of a predetermined range on the image has been changed, and an estimation means for estimating the user's line of sight based on the predetermined range of the output image.

A virtual space providing method according to an aspect of the present disclosure includes detecting a direction of an avatar in a virtual space, the direction of which changes according to a user's operation, performing control to output to the user an output image that is an image according to the direction of the avatar in the virtual space and in which a display mode of an outside of a predetermined range on the image has been changed, and estimating the user's line of sight based on the predetermined range of the output image.

A computer-readable storage medium according to an aspect of the present disclosure stores a program causing a computer to execute processing for detecting a direction of an avatar in a virtual space, the direction of which changes according to a user's operation, processing for performing control to output to the user an output image that is an image according to the direction of the avatar in the virtual space and in which a display mode of an outside of a predetermined range on the image has been changed, and processing for estimating the user's line of sight based on the predetermined range of the output image.

Advantageous Effects of Invention

According to the present disclosure, it is possible to more accurately estimate the line of sight of the user who uses the virtual space using the avatar.

EXAMPLE EMBODIMENT

Hereinafter, example embodiments of the present disclosure will be described with reference to the diagrams.

First Example Embodiment

An outline of a virtual space providing device of the present disclosure will be described.

Figure 1:
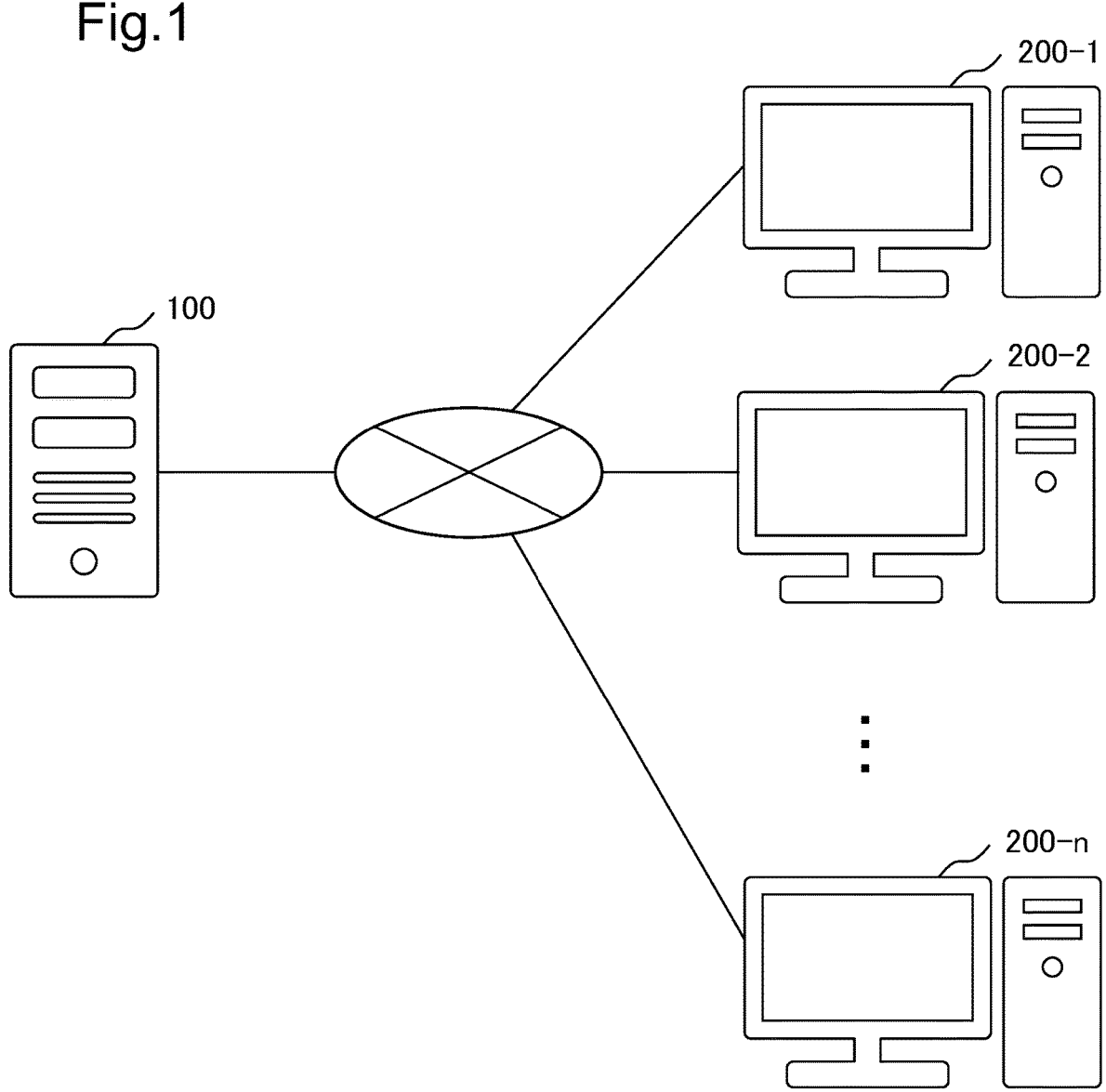
FIG. 1 is a diagram schematically illustrating an example of a configuration including a virtual space providing device according to a first example embodiment of the present disclosure.

FIG. 1 is a diagram schematically illustrating an example of a configuration including a virtual space providing device 100. As illustrated in FIG. 1, the virtual space providing device 100 is communicably connected to user terminals 200-1, 200-2, . . . , and 200-n (n is a natural number of 1 or more) through a wireless or wired network. Here, when the user terminals 200-1, 200-2, . . . , and 200-n are not distinguished from one another, these are simply referred to as user terminals 200. The user terminal 200 is a device operated by a user. The user terminal 200 is, for example, a personal computer, but is not limited to this example. The user terminal 200 may be a smartphone or a tablet terminal, or may be a device including a goggle-type wearable terminal (also referred to as a head-mounted display) having a display. The user terminal 200 includes an input device such as a keyboard, a mouse, a microphone, and a wearable device that performs an operation based on an operation of the user, and an output device such as a display and a speaker. The user terminal 200 may include an imaging device.

Figure 2:
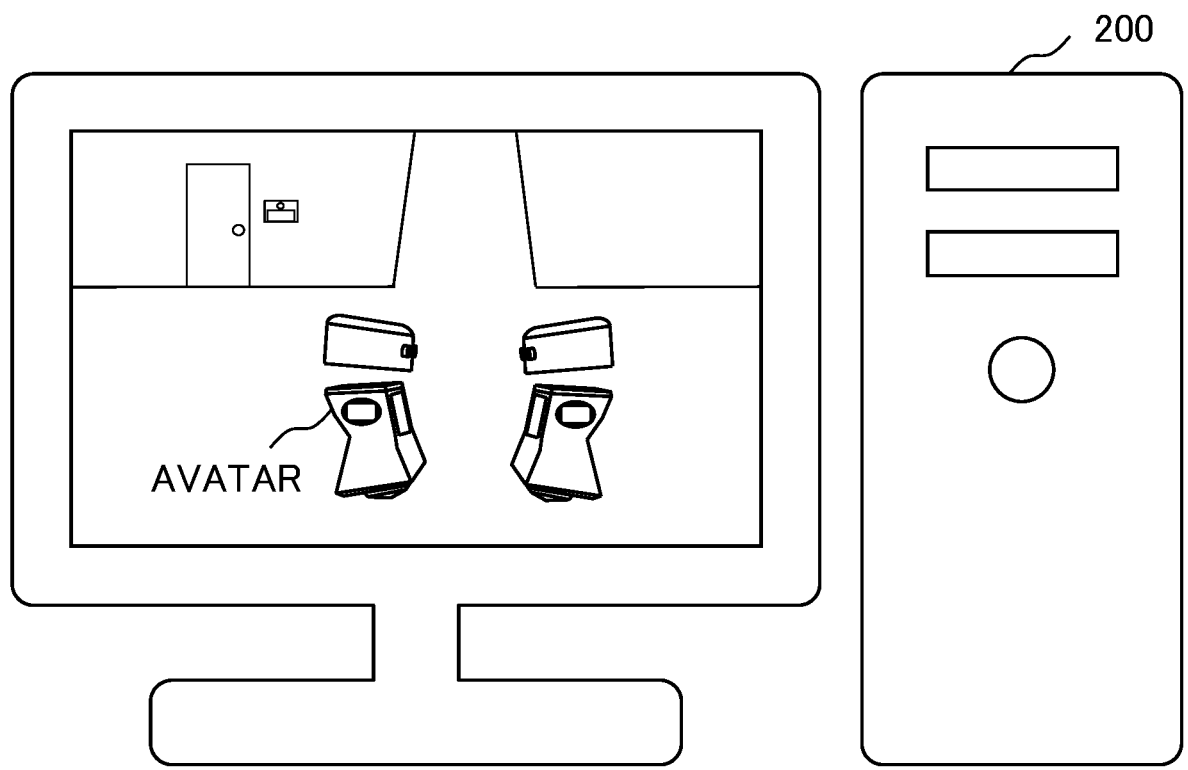
FIG. 2 is a diagram schematically illustrating an example of a virtual space displayed on a user terminal according to the first example embodiment of the present disclosure.

First, a virtual space in the present disclosure will be described. The virtual space is a virtual space shared by a plurality of users, and is a space reflecting user's operation. The virtual space is also called a virtual reality (VR) space. For example, the virtual space is provided by the virtual space providing device 100. The user terminal 200 displays an image indicating the virtual space. FIG. 2 is a diagram schematically illustrating an example of a virtual space displayed on the user terminal 200. In the example of FIG. 2, a virtual space is displayed on the display of the user terminal 200. As illustrated in FIG. 2, the virtual space includes an avatar. The avatar is an object to be operated by the user. The user uses the virtual space by operating the avatar. For example, as will be described later, an image of the virtual space of the avatar viewpoint operated by the user is displayed on the user terminal 200. In this case, the image displayed on the user terminal 200 may be updated according to the motion of the avatar. For example, the user may be able to communicate with another user by performing an action on an avatar operated by another user. A device that provides the virtual space may not be the virtual space providing device 100. For example, an external device (not illustrated) may provide the virtual space.

Figure 3:
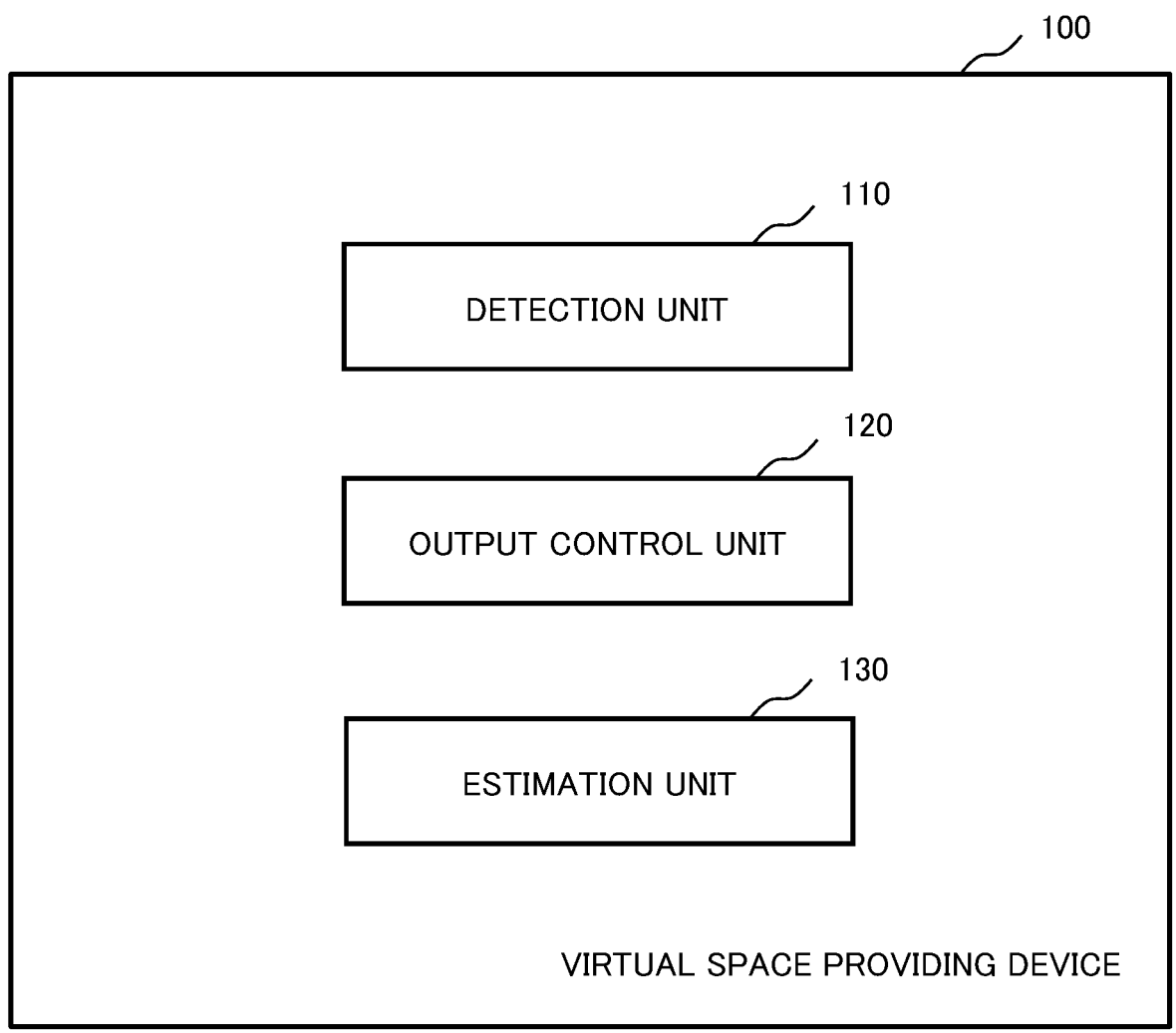
FIG. 3 is a block diagram illustrating an example of the functional configuration of the virtual space providing device according to the first example embodiment of the present disclosure.

FIG. 3 is a block diagram illustrating an example of the functional configuration of the virtual space providing device 100 according to the first example embodiment. As illustrated in FIG. 3, the virtual space providing device 100 includes a detection unit 110, an output control unit 120, and an estimation unit 130.

The detection unit 110 detects the direction of an avatar in the virtual space whose direction changes according to the user's operation. The detection unit 110 is an example of a detection means.

The output control unit 120 performs control to output various kinds of data to the user. For example, the output control unit 120 controls an image showing the virtual space to be output in the user terminal 200 used by the user. Here, the image showing the virtual space that is output to the user is also referred to as an output image. The output image is, for example, an image showing the inside of the virtual space from the viewpoint of the avatar. Since the direction of the avatar is changed by the user's operation, the output image differs according to the direction of the avatar. Therefore, for example, the output control unit 120 may update the output image according to the direction of the avatar. Then, the output control unit 120 blurs the outside of a predetermined range on the image in the output image. For example, the output control unit 120 determines a predetermined range including the center on the output image. Then, the output control unit 120 sets, for example, an image in which the display mode of the outside of the predetermined range has been changed as an output image. For example, the output control unit 120 sets, as an output image, an image in which an object appearing outside the predetermined range is not shown or an image in which an object appearing outside the predetermined range is blurred. The image in which an object is not shown may be an image in which an object shown outside the predetermined range is not displayed. The blurred image may be an image with low resolution. For example, the resolution of the predetermined range on the output image is higher than the resolution of the outside of the predetermined range on the output image. The example of blurring the image is not limited to this example. The method for determining the predetermined range is not limited to the above example. In this manner, the output control unit 120 performs control to output, to the user, an output image which is an image according to the direction of the avatar in the virtual space and in which the outside of the predetermined range on the image is blurred. The output control unit 120 is an example of an output control means.

The estimation unit 130 estimates the user's line of sight. For example, the estimation unit 130 may estimate that the user is looking in a direction of a predetermined range of the output image. The example of the estimation is not limited to this example. In this manner, the estimation unit 130 estimates the user's line of sight based on the predetermined range of the output image. The estimation unit 130 is an example of an estimation means.

Next, an example of the operation of the virtual space providing device 100 will be described with reference to FIG. 4. In the present disclosure, each step in the flowchart is represented by using a number assigned to each step, such as "S1".

Figure 4:
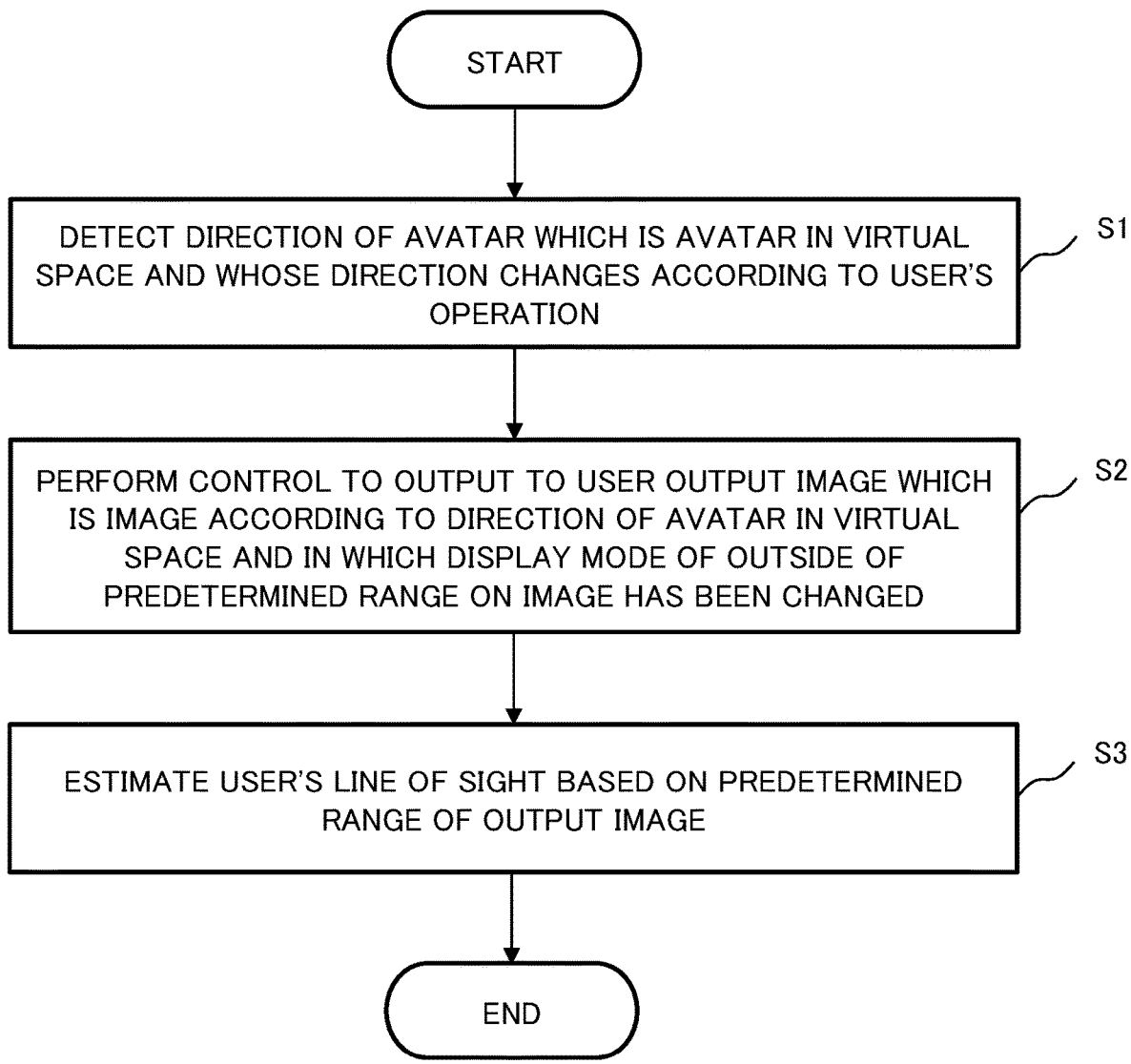
FIG. 4 is a flowchart illustrating an example of an operation of the virtual space providing device according to the first example embodiment of the present disclosure.

FIG. 4 is a flowchart illustrating an example of the operation of the virtual space providing device 100. The detection unit 110 detects the direction of an avatar in the virtual space (S1). The output control unit 120 performs control to output an output image, which is an image showing a virtual space according to the direction of the avatar and in which the display mode of the outside of a predetermined range on the image has been changed, to the user who operates the avatar (S2). Then, the estimation unit 130 estimates the user's line of sight based on the predetermined range of the output image (S3).

In this manner, the virtual space providing device 100 according to the first example embodiment detects the direction of an avatar in the virtual space whose direction changes according to the user's operation, performs control to output to the user an output image which is an image according to the direction of the avatar in the virtual space and in which the display mode of the outside of a predetermined range on the image has been changed, and estimate the user's line of sight based on the predetermined range of the output image. A part of the image output to the user is, for example, blurred. Therefore, the user operates the avatar so that a portion that the user desires to see is not blurred, for example. That is, the virtual space providing device 100 can prompt the user to perform an operation so that the portion that the user desires to see appears at a specific position on the output image. This increases a possibility that the user will see the specific position on the output image. Therefore, the virtual space providing device 100 can more accurately estimate the line of sight of the user who uses the virtual space using the avatar.

Second Example Embodiment

Next, a virtual space providing device according to a second example embodiment will be described. In the second example embodiment, the virtual space providing device 100 described in the first example embodiment will be described in more detail.

[Details of Virtual Space Providing Device 100]

Figure 5:
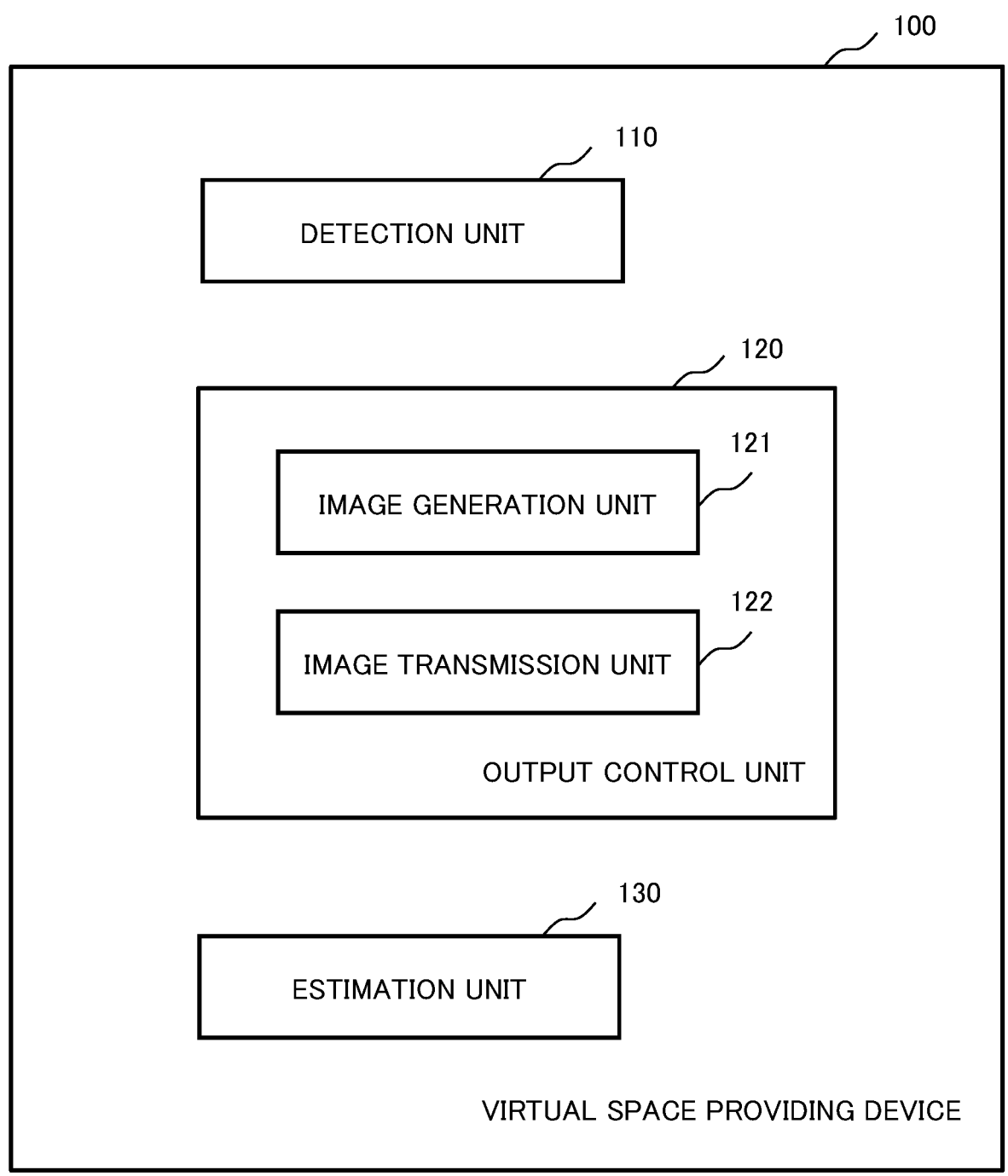
FIG. 5 is a block diagram illustrating an example of the functional configuration of a virtual space providing device according to a second example embodiment of the present disclosure.

FIG. 5 is a block diagram illustrating an example of the functional configuration of the virtual space providing device 100 according to the second example embodiment. As illustrated in FIG. 5, the virtual space providing device 100 includes a detection unit 110, an output control unit 120, and an estimation unit 130.

The detection unit 110 detects the direction of an avatar. For example, the detection unit 110 detects the direction of the avatar's face as the direction of the avatar. The example of the direction of the avatar detected by the detection unit 110 is not limited to this example. On the user terminal 200, an image from the viewpoint of the avatar operated by the user is displayed by the output control unit 120. That is, assuming that a part of the avatar is a camera, a virtual space reflected in the camera is displayed on the user terminal 200. Therefore, the detection unit 110 may detect the direction of a part of the avatar, which is the camera, as the direction of the avatar.

The output control unit 120 includes an image generation unit 121 and an image transmission unit 122. The image generation unit 121 generates an output image. First, the image generation unit 121 determines the field of view of the avatar according to the detected direction of the avatar. In other words, the image generation unit 121 determines, according to the direction of the avatar, the range in the virtual space reflected in the camera when a part of the avatar is the camera. Then, the image generation unit 121 generates an output image in which the display mode of the outside of the predetermined range has been changed on the image showing the determined range. Hereinafter, the predetermined range is also referred to as a range of interest.

Figure 6:
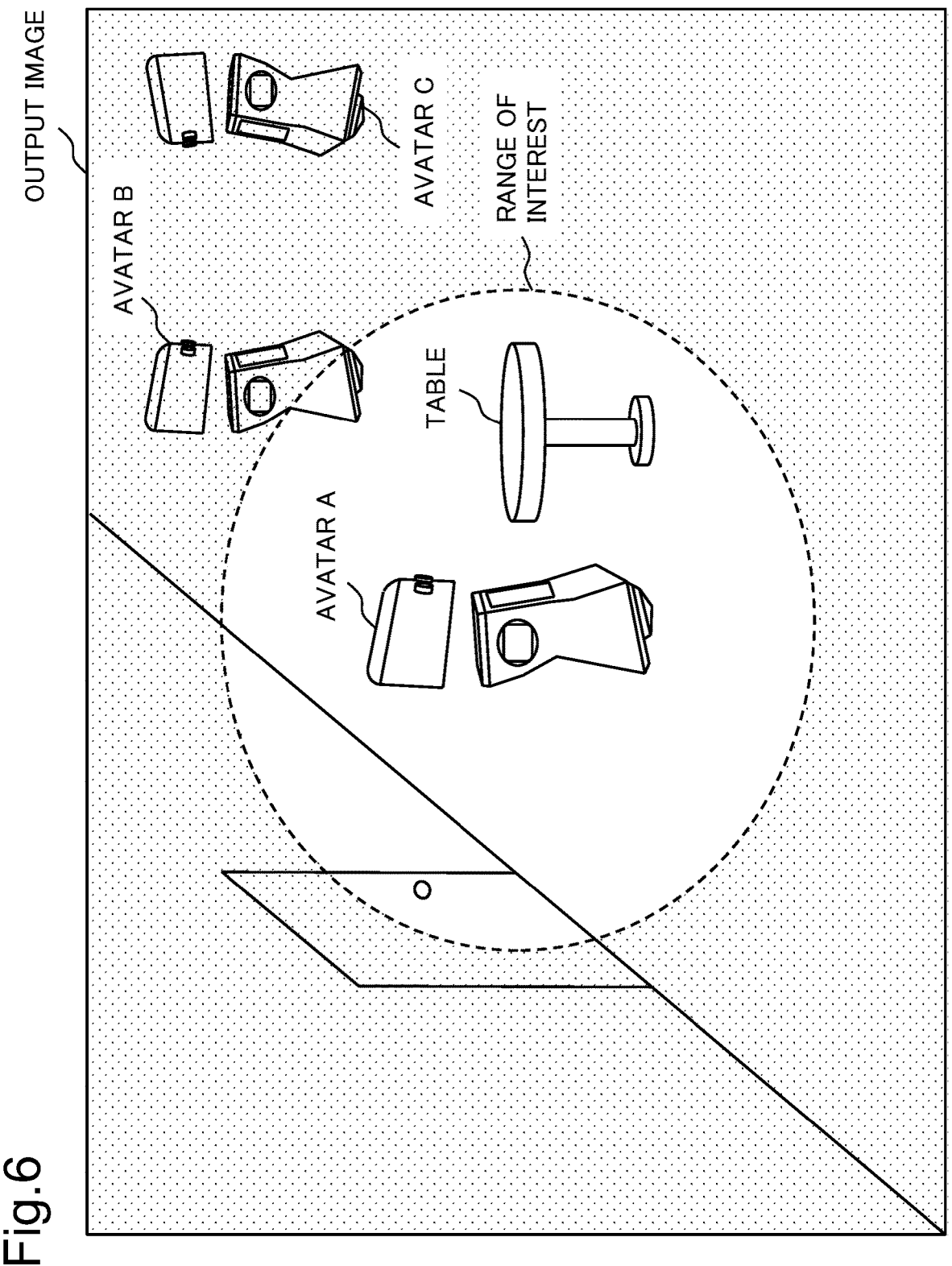
FIG. 6 is a diagram illustrating an example of an output image according to the second example embodiment of the present disclosure.

FIG. 6 is a diagram illustrating an example of an output image. The output image is an image from the viewpoint of a predetermined avatar. In the example of FIG. 6, a range including the center of the output image is set as the range of interest. A hatched portion outside the range of interest indicates a range in which the display mode has been changed. In the example of FIG. 6, in the output image, an avatar A and a table are displayed without being blurred, and an avatar B and an avatar C are displayed in a blurred manner.

Here, blurring may be processing for reducing the resolution. In this case, in the example of FIG. 6, the resolution of the hatched portion is lower than that of the non-hatched portion. Without being limited to this example, the blurring processing may be, for example, processing for lightening the color, processing for reducing the contrast, or mask processing. For example, in the example of FIG. 6, when the processing for lightening the color is performed, the color of the hatched portion becomes lighter than that of the non-hatched portion. In the example of FIG. 6, when the processing for reducing the contrast is performed, the color contrast of the hatched portion is lower than that of the non-hatched portion. In the example of FIG. 6, when the mask processing is performed, mask processing for superimposing another image on the hatched portion is performed. At this time, the image generation unit 121 may generate an output image in which an object at a hatched portion is seen through another superimposed image. The position, shape, and size of the range of interest are not limited to the example of FIG. 6.

As described above, the image generation unit 121 generates, as an output image, an image from the viewpoint of the avatar in which the display mode of the outside of the predetermined range has been changed. The image generation unit 121 is an example of an image generation means.

Figure 7:
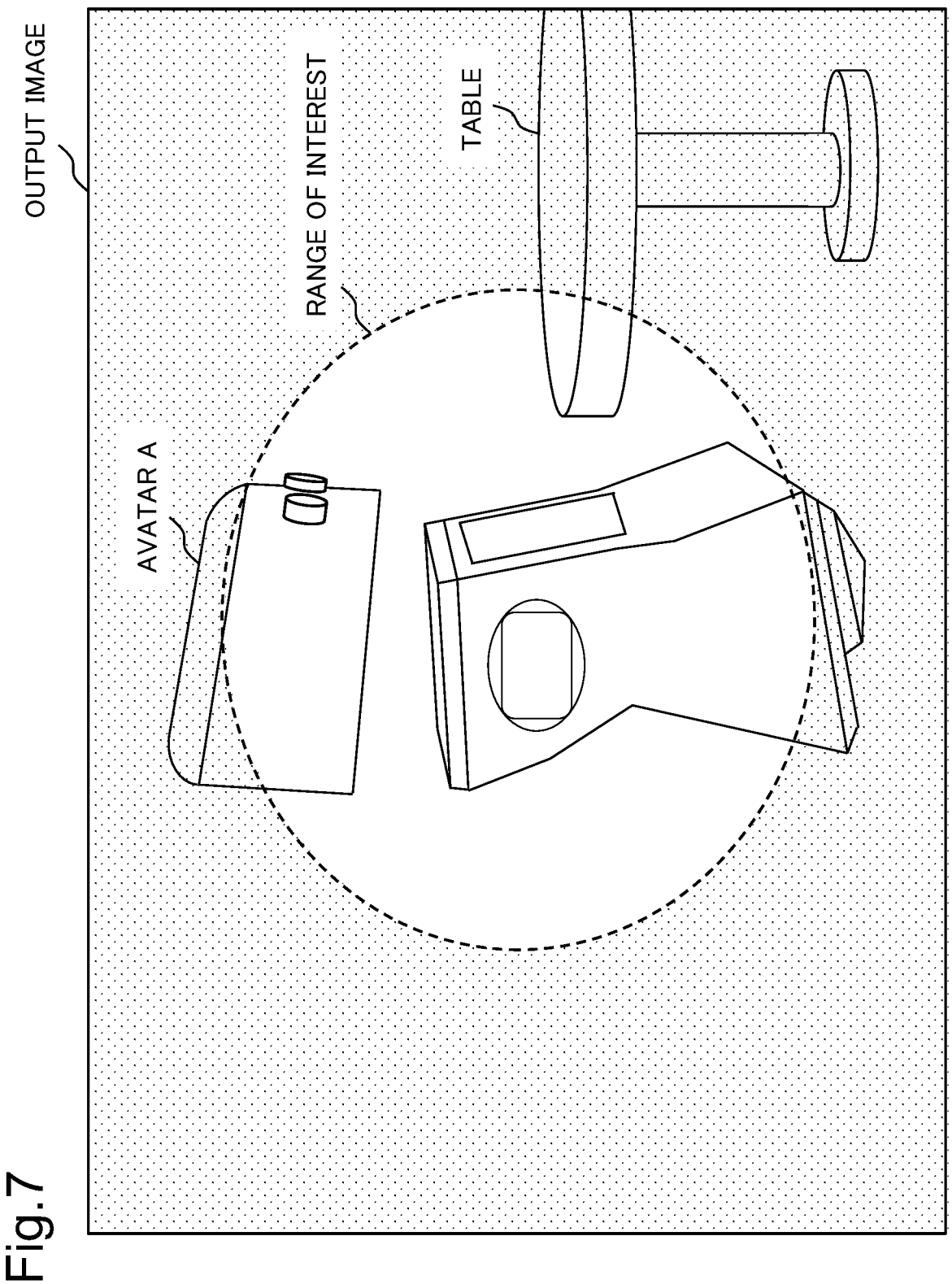
FIG. 7 is a diagram illustrating another example of an output image according to the second example embodiment of the present disclosure.

FIG. 7 is a diagram illustrating another example of the output image. In the example of FIG. 7, the avatar A appears in the vicinity of the center of the range of interest, but also appears to protrude outside the range of interest. There is a high possibility that the user will pay attention to an object in the vicinity of the center of the range of interest. Therefore, when the object appearing at the center of the range of interest also appears outside the range of interest, the image generation unit 121 may blur a range outside the range of interest excluding the range in which the object appears. The image generation unit 121 may perform this processing even if the object does not appear at the center of the range of interest. For example, when an object that appears within a range of interest and appears within a predetermined distance from the center of the range of interest also appears outside the range of interest, the image generation unit 121 may blur a range outside the range of interest excluding the range in which the object appears. As described above, when an object appears within the predetermined distance from the center of the predetermined range and the object appearing within the predetermined distance also appears outside the predetermined range, the image generation unit 121 may generate an output image in which the display mode of the range not including the object appearing within the predetermined distance and outside the predetermined range has been changed.

Hereinafter, as an example of changing the display mode of the outside of the predetermined range, an example of performing blurring processing will be mainly described. However, the example of changing the display mode is not limited to the above example. For example, the image generation unit 121 may generate, as an output image, an image in which an object appearing outside the range of interest is not displayed. In this case, the image generation unit 121 may generate an image in which none of the objects outside the range of interest are displayed, or may generate an image in which a specific object among the objects outside the range of interest is not displayed. The specific object may be, for example, an object different from the background, such as another avatar or a screen on the virtual space. When the image generation unit 121 generates an image in which an object appearing outside the range of interest is not displayed, the range of interest may be a range along the shape of an object present at the center of the image.

The image transmission unit 122 transmits the generated output image to the user terminal 200. Since the image transmission unit 122 transmits the output image to a display device such as the user terminal 200 including a display or the like, the output image is displayed on the display device. In this manner, the image transmission unit 122 transmits the generated output image to the display device used by the user. The image transmission unit 122 is an example of an image transmission means.

The estimation unit 130 estimates the user's line of sight based on the output image. Specifically, the estimation unit 130 estimates that the user is gazing at the range of interest. The estimation unit 130 may estimate that the user is gazing at an object appearing in the range of interest. When a plurality of objects appear in the range of interest, the estimation unit 130 may estimate that the user is gazing at the plurality of objects, or may estimate that the user is gazing at one of the plurality of objects. For example, in the example of FIG. 6, the avatar A and the table are included in the range of interest. In this case, the estimation unit 130 may estimate that the user is gazing at the avatar A, which is an object closer to the center of the range of interest.

[Operation Example of Virtual Space Providing Device 100]

Figure 8:
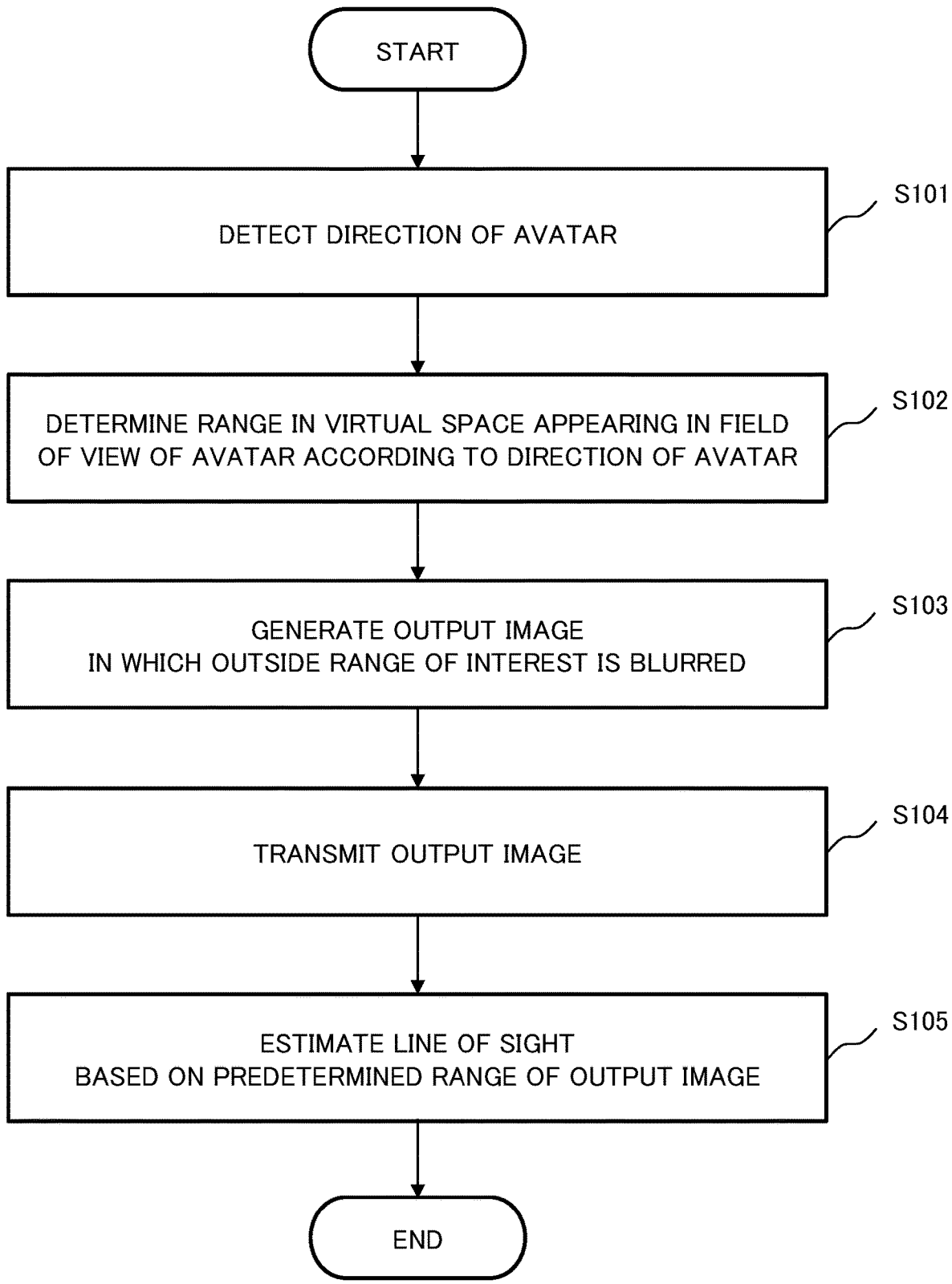
FIG. 8 is a flowchart illustrating an example of an operation of the virtual space providing device according to the second example embodiment of the present disclosure.

Next, an example of the operation of the virtual space providing device 100 according to the second example embodiment will be described with reference to FIG. 8. FIG. 8 is a flowchart illustrating an example of the operation of the virtual space providing device 100. Specifically, FIG. 8 illustrates an operation example when the virtual space providing device 100 estimates the user's line of sight.

First, the detection unit 110 detects the direction of an avatar (S101). The image generation unit 121 determines a range in the virtual space appearing in the field of view of the avatar according to the direction of the avatar (S102). Then, the image generation unit 121 generates an output image in which the determined range is reflected and the outside of the range of interest on the image is blurred (S103). The image transmission unit 122 transmits the generated output image to the user terminal 200 (S104). The estimation unit 130 estimates a line of sight based on a predetermined range of the output image (S105). For example, the estimation unit 130 estimates that the user is gazing at the range of interest of the output image.

In this operation example, the processing of S105 may be performed at any timing after the processing of S103.

In this manner, the virtual space providing device 100 according to the second example embodiment detects the direction of an avatar in the virtual space whose direction changes according to the user's operation, performs control to output to the user an output image which is an image according to the direction of the avatar in the virtual space and in which the display mode of the outside of a predetermined range on the image has been changed, and estimate the user's line of sight based on the output image. A part of the image output to the user is, for example, blurred. Therefore, the user operates the avatar so that a portion that the user desires to see is not blurred, for example. That is, the virtual space providing device 100 can prompt the user to perform an operation so that the portion that the user desires to see appears at a specific position on the output image. This increases a possibility that the user will see the specific position on the output image. Therefore, the virtual space providing device 100 can more accurately estimate the line of sight of the user who uses the virtual space using the avatar.

As a method of estimating the user's line of sight, a method of imaging the face of the user with a camera and estimating the line of sight from the captured face of the user can be considered. As compared with such a method, the virtual space providing device 100 estimates the user's line of sight from the output image according to the direction of the avatar. Therefore, it is possible to reduce the calculation load on the estimation of the line of sight. In the former method, it is necessary to transmit a captured image showing the user's face to a device that performs line-of-sight estimation through the network. For this reason, there is a risk that the amount of communication increases. On the other hand, since the virtual space providing device 100 does not need to transmit a captured image for line-of-sight estimation, the amount of communication can be suppressed.

When a plurality of objects are included in a predetermined range, the virtual space providing device 100 according to the second example embodiment may estimate that the user's line of sight is directed to an object closer to the center of the predetermined range. As a result, the virtual space providing device 100 can specify which object the user is looking at.

When an object appears within the predetermined distance from the center of the predetermined range and the object appearing within the predetermined distance also appears outside the predetermined range, the virtual space providing device 100 according to the second example embodiment may generate an output image in which the display mode of the range not including the object appearing within the predetermined distance and outside the predetermined range has been changed. As a result, the virtual space providing device 100 can clarify the range in which the object that the user may be interested in appears.

Third Example Embodiment

Next, a virtual space providing device according to a third example embodiment will be described. In the third example embodiment, processing for a user's operation will be mainly described. A part of the description overlapping the first and second example embodiments will be omitted.

[Details of Virtual Space Providing Device 101]

Figure 9:
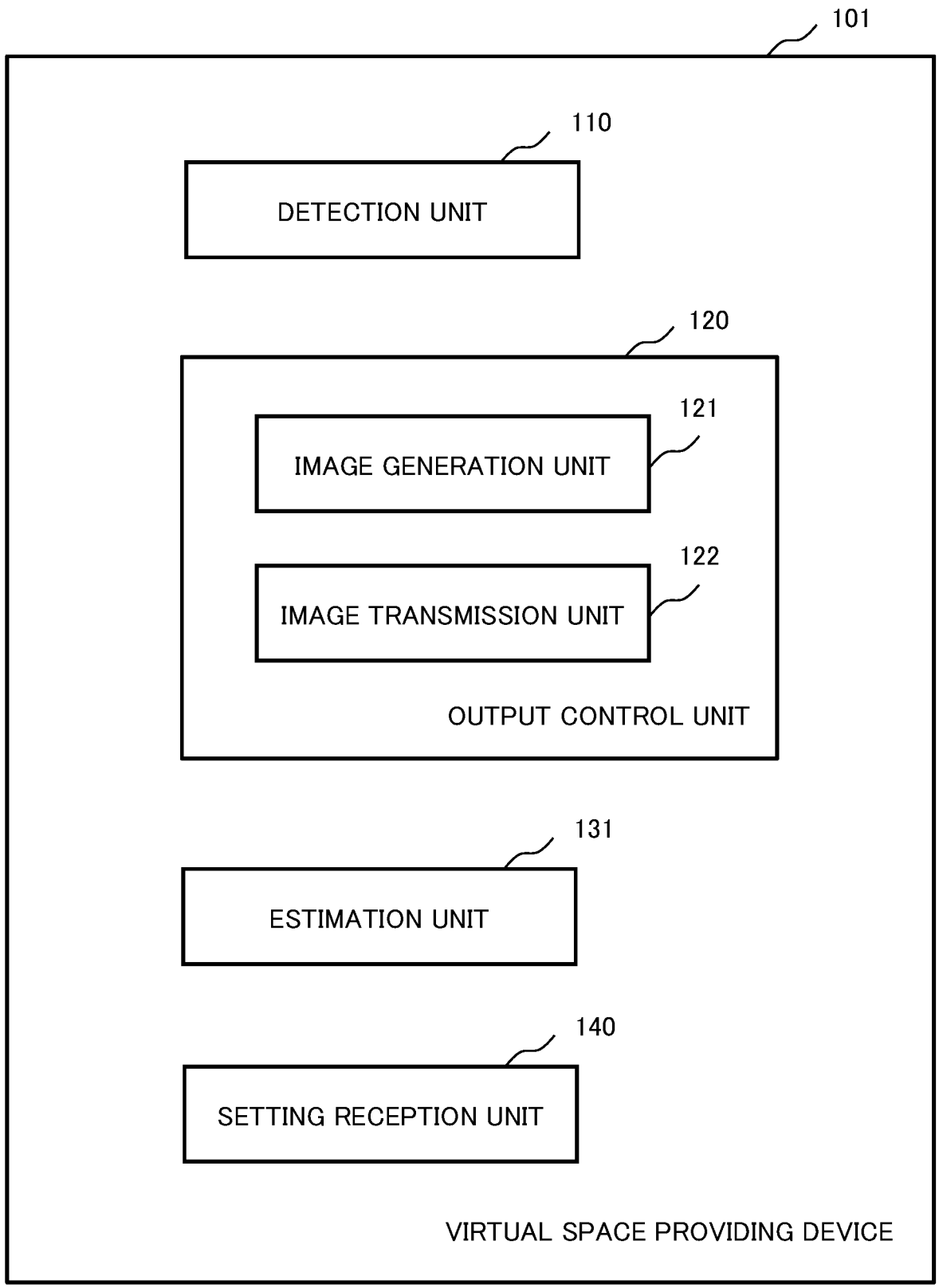
FIG. 9 is a block diagram illustrating an example of the functional configuration of a virtual space providing device according to a third example embodiment of the present disclosure.

FIG. 9 is a block diagram illustrating an example of the functional configuration of a virtual space providing device 101 according to the third example embodiment. Similarly to the virtual space providing device 100, the virtual space providing device 101 is communicably connected to a plurality of user terminals 200 through a wireless or wired network.

As illustrated in FIG. 9, the virtual space providing device 101 includes a detection unit 110, an output control unit 120, an estimation unit 131, and a setting reception unit 140.

The estimation unit 131 performs the following processing in addition to the processing of the estimation unit 130.

Figure 10:
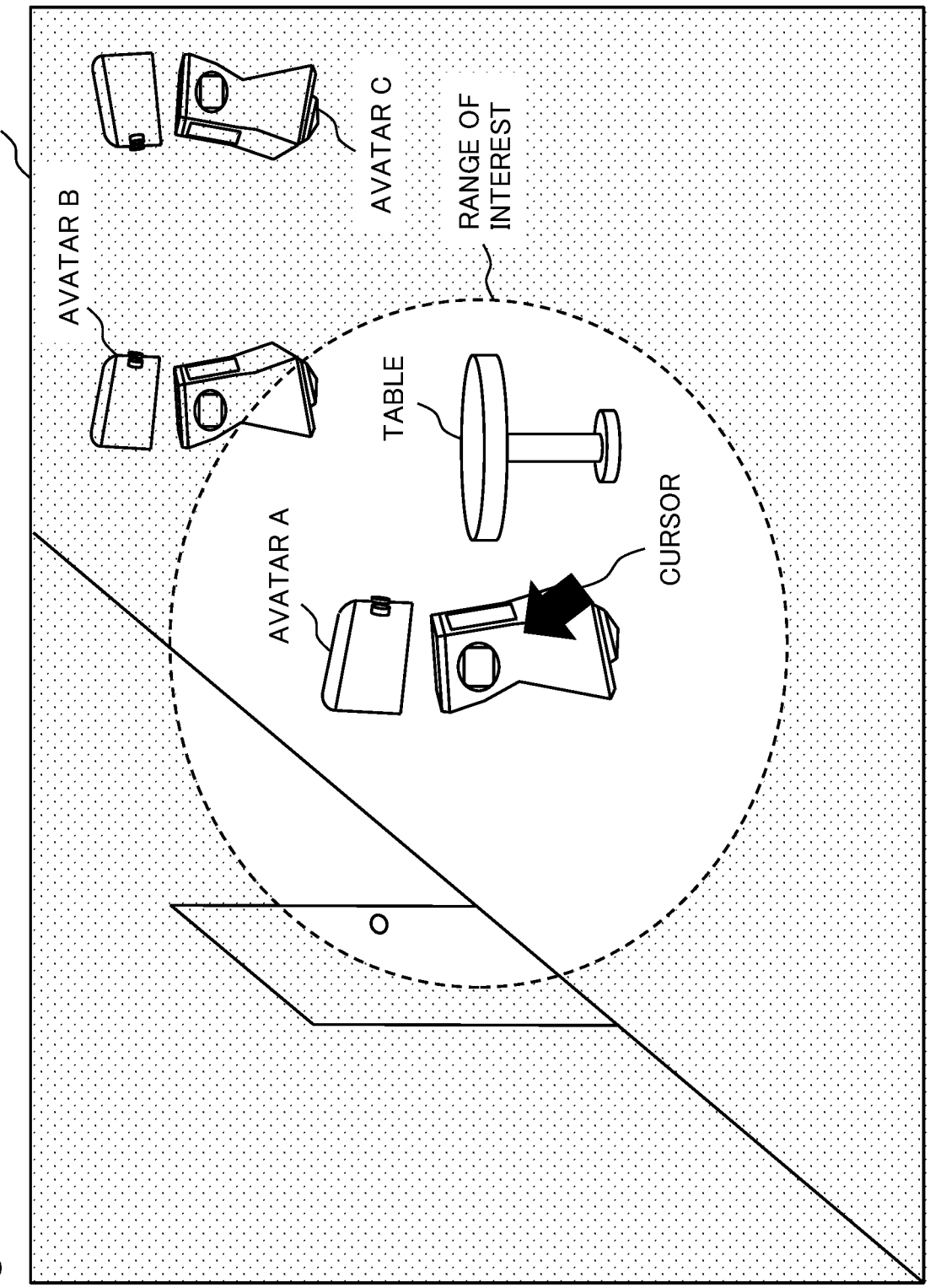
FIG. 10 is a diagram illustrating an example of an output image according to the third example embodiment of the present disclosure.

Specifically, the estimation unit 131 may estimate the line of sight in accordance with the user's operation. FIG. 10 is a diagram illustrating an example of an output image. The output image illustrated in FIG. 10 is different from the output image illustrated in FIG. 6 in that a cursor is superimposed. For example, the user performs various operations using a device such as a mouse provided in the user terminal 200. The cursor illustrated in FIG. 10 is, for example, a cursor operated by a mouse. Here, in the example of FIG. 10, the cursor points to the avatar A. In this case, the estimation unit 131 may estimate that the user is gazing at the avatar A indicated by the cursor. In the example of FIG. 10, when the cursor points to a table, the estimation unit 131 may estimate that the user is gazing at the table. When the cursor is located outside the range of interest, the estimation unit 131 may estimate that the user is gazing at not the object pointed to by the cursor but the object in the range of interest. As described above, when the cursor indicated by the user operating the device is located inside the predetermined range, the estimation unit 131 estimates that the user is facing the object pointed to by the cursor.

The setting reception unit 140 receives a setting related to the range of interest from the user terminal 200. The setting regarding the range of interest is, for example, a position, a size, a shape, and the like on the output image. The setting reception unit 140 receives, from the user terminal 200, setting information including at least one of the position, size, and shape of the range of interest input by the user. Then, the setting reception unit 140 sets the range of interest based on the received setting information. As described above, the setting reception unit 140 receives the setting of at least one of the position, the size, and the shape of the predetermined range. The setting reception unit 140 is an example of a setting reception means.

[Operation Example of Virtual Space Providing Device 101]

Figure 11:
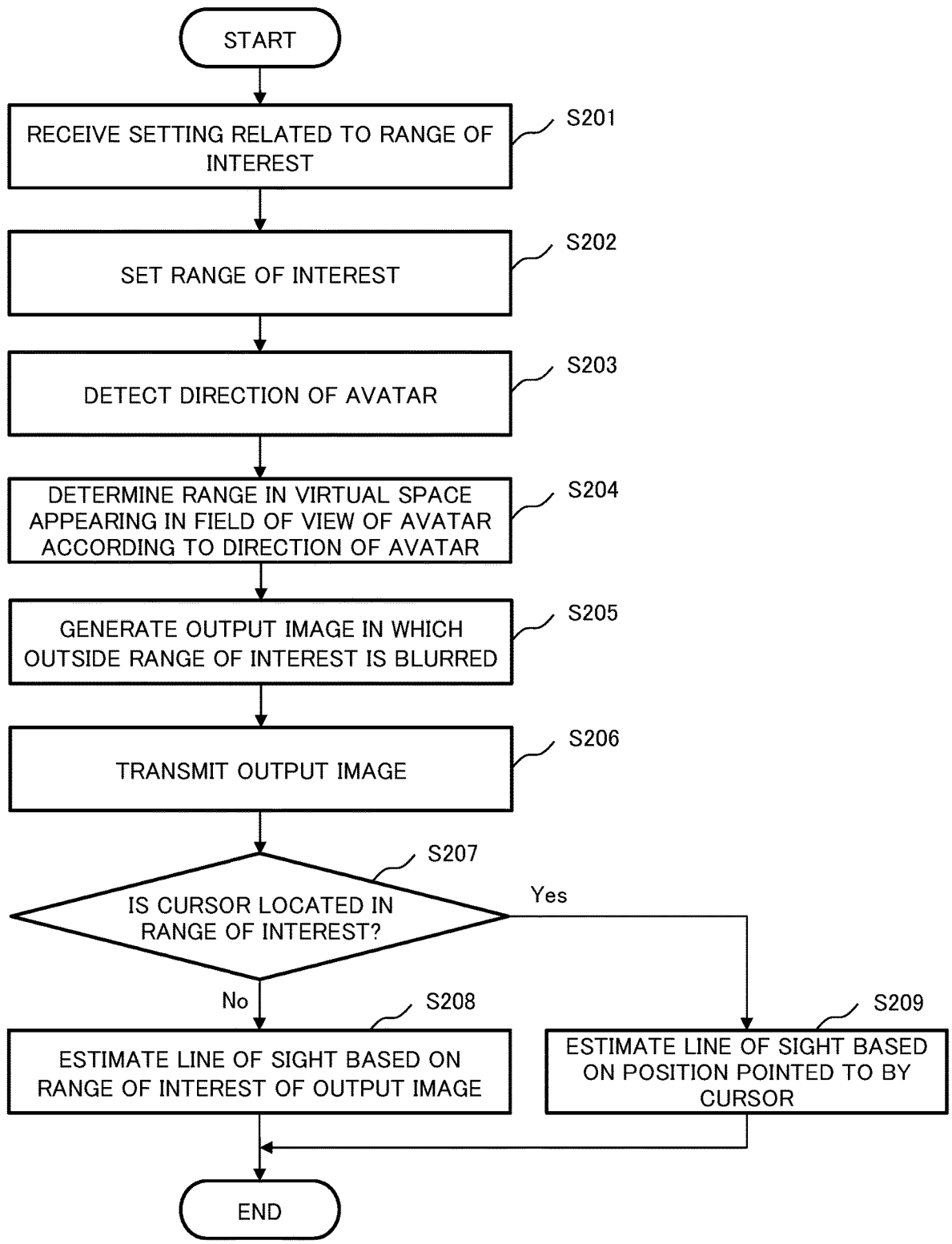
FIG. 11 is a flowchart illustrating an example of an operation of the virtual space providing device according to the third example embodiment of the present disclosure.

Next, an example of the operation of the virtual space providing device 101 according to the third example embodiment will be described with reference to FIG. 11. FIG. 11 is a flowchart illustrating an example of the operation of the virtual space providing device 101. Specifically, FIG. 11 illustrates an operation example when the virtual space providing device 101 estimates the user's line of sight.

The setting reception unit 140 receives a setting related to the range of interest from the user (S201). Specifically, the setting reception unit 140 receives, from the user terminal 200, setting information including at least one of the position, size, and shape of the range of interest. Then, the setting reception unit 140 sets the range of interest based on the received setting information (S202).

Since the processing of S203 to S206 is similar to the processing of S101 to S105 of FIG. 8, description thereof will be omitted. After the processing of S206, when the cursor is not located within the range of interest ("No" in S207), the estimation unit 131 estimates the line of sight based on the range of interest of the output image similarly to the processing of S105 (S208). When the cursor is located within the range of interest ("Yes" in S207), the estimation unit 131 estimates the line of sight based on the position pointed to by the cursor (S209).

As described above, the virtual space providing device 101 according to the third example embodiment may receive the setting of at least one of the position, the size, and the shape of the predetermined range. As a result, the virtual space providing device 101 can set the desired range of the user to the predetermined range.

When the cursor indicated by the user operating the device is located inside the predetermined range, the virtual space providing device 101 according to the third example embodiment may estimate that the user is facing the object pointed to by the cursor. There is a high possibility that the user is paying attention to the portion pointed to by the user's operation. With the above configuration, the virtual space providing device 101 can estimate the user's line of sight more accurately.

Fourth Example Embodiment

Next, a virtual space providing device according to a fourth example embodiment will be described. In the fourth example embodiment, an example of using processing of estimating the user's emotion will be mainly described. A part of the description overlapping the first, second, and third example embodiments will be omitted.

[Details of Virtual Space Providing Device 102]

Figure 12:
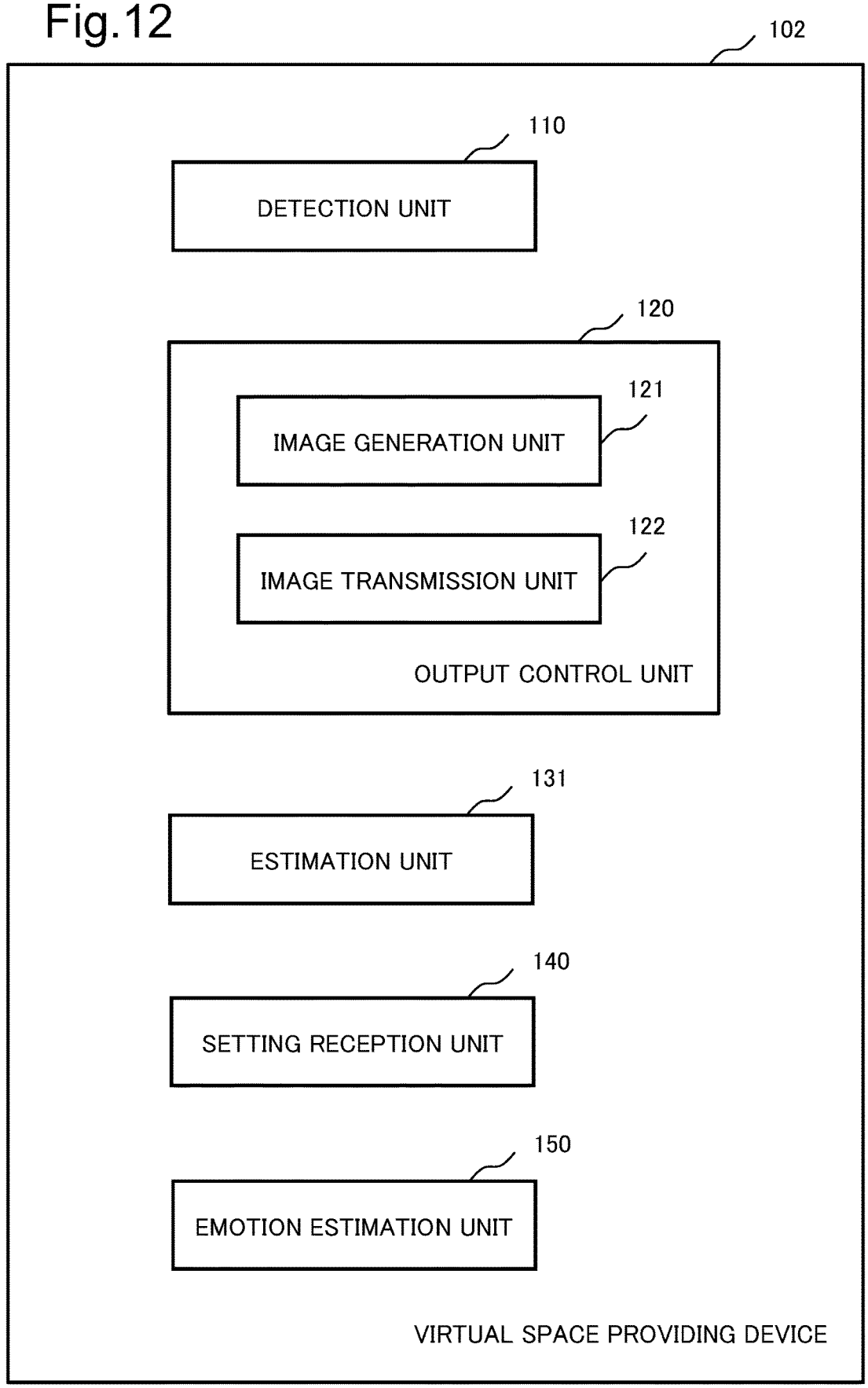
FIG. 12 is a block diagram illustrating an example of the functional configuration of a virtual space providing device according to a fourth example embodiment of the present disclosure.

FIG. 12 is a block diagram illustrating an example of the functional configuration of a virtual space providing device 102 according to the fourth example embodiment. Similarly to the virtual space providing devices 100 and 101, the virtual space providing device 102 is communicably connected to a plurality of user terminals 200 through a wireless or wired network.

As illustrated in FIG. 12, the virtual space providing device 102 includes a detection unit 110, an output control unit 120, an estimation unit 131, a setting reception unit 140, and emotion estimation unit 150.

The emotion estimation unit 150 acquires a captured image captured by an imaging device and estimates the emotion of the user appearing in the captured image. In this case, it is assumed that the user terminal 200 includes an imaging device and the user's face is captured by the imaging device. For example, the emotion estimation unit 150 extracts a feature amount from a region where the user's face appears in the captured image. Then, the emotion estimation unit 150 estimates an emotion based on the extracted feature amount and data indicating a relationship between the feature amount and the emotion. The data indicating the relationship between the feature amount and the emotion may be stored in advance in a storage device (not illustrated) included in the virtual space providing device 102. The data indicating the relationship between the feature amount and the emotion may be stored in an external device communicably connected to the virtual space providing device 102. The estimated emotion is, for example, a predetermined emotion such as "happy", "angry", "sad", "enjoying", "impatient", or "nervous". When a characteristic emotion cannot be estimated from the user, the emotion estimation unit 150 may estimate "calm" indicating that the user is calm. The emotion estimation unit 150 may estimate motions caused by emotions such as "laughing" and "crying". These are examples of estimated emotions, and other emotions may be estimated.

The method of estimating the user's emotion from the captured image may be, for example, a method of estimating the user's emotion by pattern matching between a region on a captured image in which the user's face appears and an image registered in the image database and associated with information indicating the human emotion. At this time, the image database is stored in, for example, a storage device (not illustrated) of the virtual space providing device 102. The method of estimating the user's emotion from the captured image may be a method of extracting the user's feature amount from a region on a captured image in which the user's face appears and outputting an emotion corresponding to the user's feature amount by using an estimation model such as a neural network using the extracted feature amount as an input.

As described above, the emotion estimation unit 150 estimates the user's emotion for an object appearing within the predetermined range based on the captured image in which the user captured by the imaging device appears. The emotion estimation unit 150 is an example of an emotion estimation means.

Figure 13:
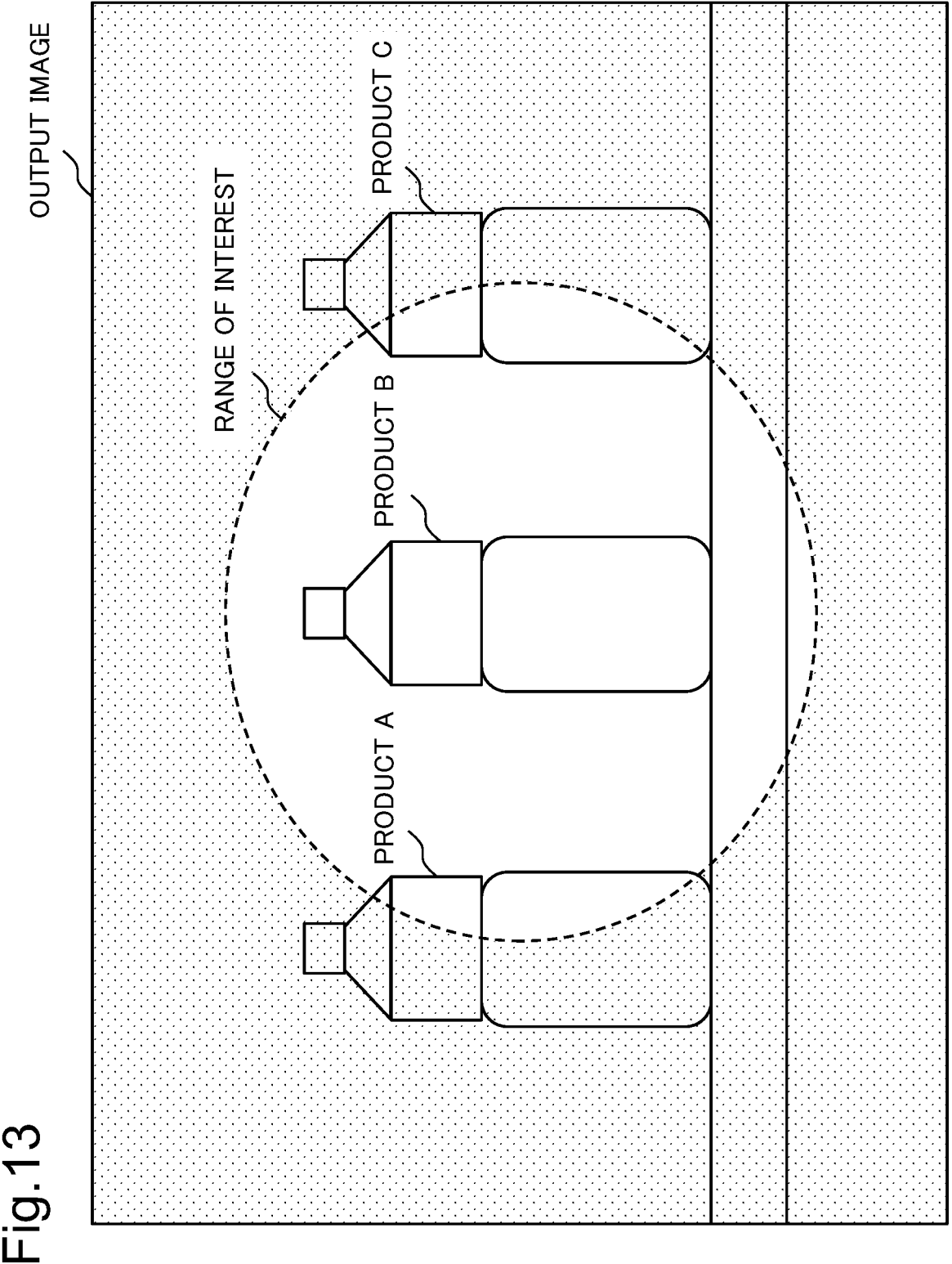
FIG. 13 is a diagram illustrating an example of an output image according to the fourth example embodiment of the present disclosure.

For example, it is assumed that the user's line of sight is estimated by the estimation unit 131 and an object gazed at by the user is specified. In this case, the emotion estimated by the emotion estimation unit 150 can be an emotion for the object gazed at by the user. FIG. 13 is a diagram illustrating an example of an output image. In the example of FIG. 13, a product shelf on which a product A, a product B, and a product C are arranged is shown in the output image. At this time, it is assumed that the estimation unit 131 estimates that the user is gazing at the product B and the emotion estimation unit 150 estimates "happy" as the user's emotion. In this case, it can be seen that the user shows a positive reaction to the product B.

The emotion estimation unit 150 may store information in which an object being gazed is associated with the user's emotion. The emotion estimation unit 150 may add information indicating the estimated user's emotion to the avatar operated by the user. At this time, the emotion estimation unit 150 may add characters, symbols, colors, and the like according to the emotion to the avatar. The emotion estimation unit 150 may change the expression of the avatar or change the shape of the avatar according to the emotion. When the information indicating the user's emotion is added to the avatar, the emotion estimation unit 150 may further add information indicating what the emotion is for to the avatar.

[Operation Example of Virtual Space Providing Device 102]

Figure 14:
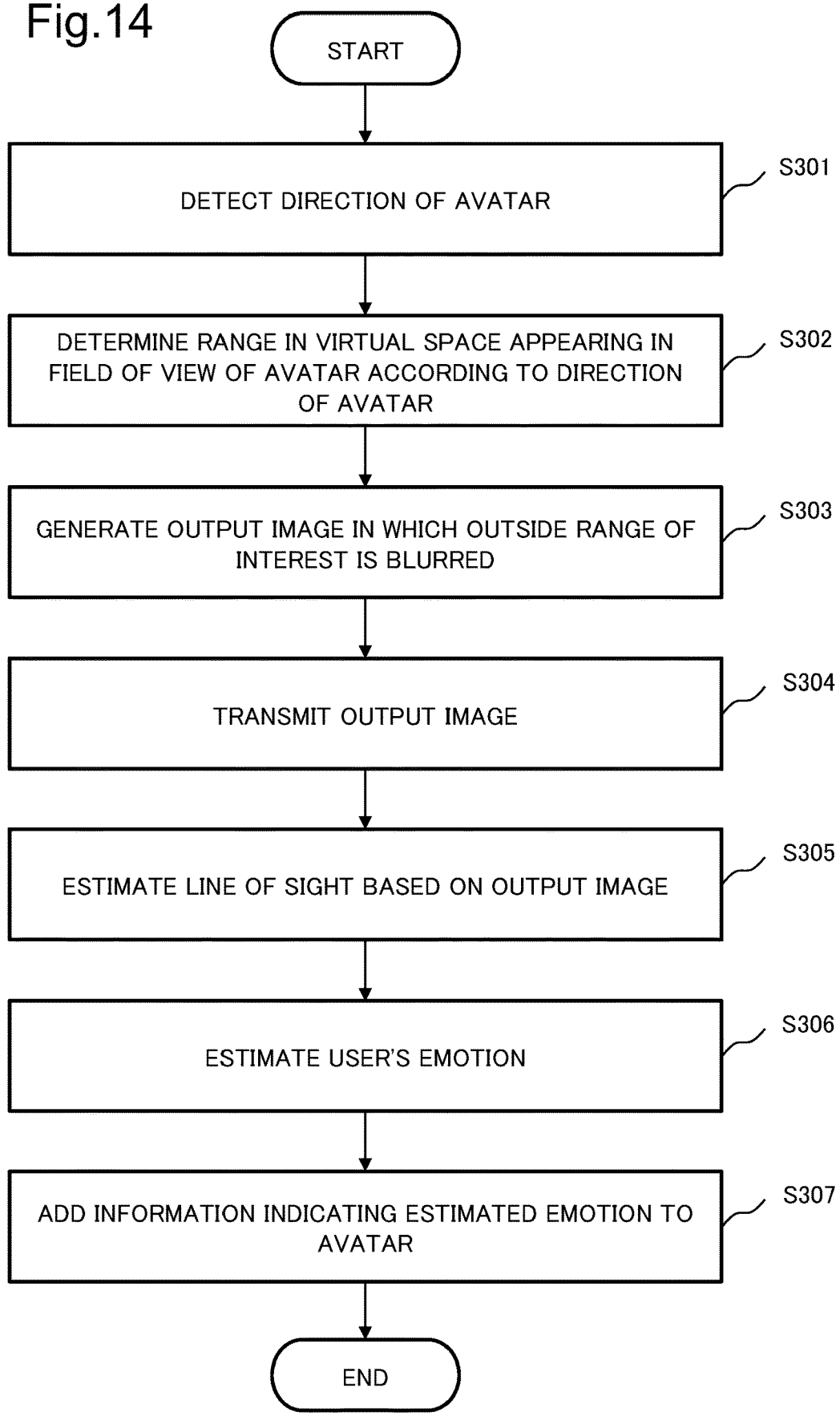
FIG. 14 is a flowchart illustrating an example of an operation of the virtual space providing device according to the fourth example embodiment of the present disclosure.

Next, an example of the operation of the virtual space providing device 102 according to the fourth example embodiment will be described with reference to FIG. 14. FIG. 14 is a flowchart illustrating an example of the operation of the virtual space providing device 102. Specifically, FIG. 14 illustrates an operation example when the virtual space providing device 102 estimates the user's emotion.

Since the processing of S301 to S305 is similar to the processing of S101 to S105 of FIG. 8, description thereof will be omitted. After the processing of S305, the emotion estimation unit 150 estimates the user's emotion based on the captured image captured by the user terminal 200 (S306). Then, the emotion estimation unit 150 adds information indicating the estimated emotion to the avatar (S307).

The operation example of FIG. 14 is merely an example of an operation example of the virtual space providing device 102. For example, the virtual space providing device 102 may perform the operations of S306 and S307 after the processing of S208 or S209 in the operation example of FIG. 11.

As described above, the virtual space providing device 102 according to the fourth example embodiment may estimate the user's emotion for an object appearing within the predetermined range based on the captured image in which the user captured by the imaging device appears. As a result, the virtual space providing device 102 can acquire the user's emotion for the target to which the estimated user's line of sight is directed.

When acquiring the user's emotion for a target of the user's line of sight, it is necessary to estimate the user's line of sight. As a method of estimating the line of sight, there is a method of estimating the user's line of sight from a captured image in which the user's face appears. On the other hand, the virtual space providing device 102 estimates the user's line of sight based on the predetermined range of the output image. Therefore, the virtual space providing device 102 can reduce the calculation load on the line-of-sight estimation as compared with the method of estimating the user's line of sight from the captured image in which the user's face appears.

MODIFICATION EXAMPLES

In the first to fourth example embodiments, an example has been described in which the processing of estimating the line of sight and the processing of estimating the emotion are performed by the virtual space providing device. The processing of estimating the line of sight and the processing of estimating the emotion may be performed by the user terminal 200, for example. In other words, the estimation unit 130 or 131 and the emotion estimation unit 150 may also be provided in the user terminal 200. For example, the user terminal 200 estimates the user's line of sight based on the range of interest of the output image. Then, the user terminal 200 may transmit information regarding the estimated user's line of sight to the virtual space providing device. For example, the user terminal 200 captures the user's face and estimates the user's emotion based on the captured image. Then, the user terminal 200 may transmit information indicating the estimated user's emotion to the virtual space providing device.

Examples of Application Scene

Next, examples of a scene to which the virtual space providing device of the present disclosure is applied will be described. The following description is merely an example, and the scene to which the virtual space providing device of the present disclosure is applied is not limited to the following scene.

[Scene 1]

When a company or the like performs telework, employees communicate with each other by, for example, e-mail or chat. However, it is difficult for an employee to grasp a state of another employee only by e-mail, chat, or the like.

Therefore, in order to perform telework, a virtual office is constructed in a virtual space. For example, a user (employee) communicates with another user in a virtual office through an avatar. At this time, by using the virtual space providing device, the user can know what another user is looking at and what kind of emotion another user has for the target that the user is looking at. Therefore, the user can respond in accordance with the situation of another user.

In a real space, a person can see the complexion of another person, but in telework, it is difficult to see the complexion of another person. On the other hand, by using the virtual space providing device, the user can acquire emotions of other users. Therefore, for example, the user can grasp that another user is in trouble and help another user.

[Scene 2]

For example, it is assumed that a seminar is held in a virtual space. In such a case, for example, the user who is a lecturer at a seminar can grasp where the user who is an audience is looking at during the seminar. The user who is a lecturer can grasp what kind of emotion the audience has. By using these pieces of information, the user who is a lecturer can obtain feedback on the content of the lecture, for example. Therefore, for example, when the user who is a lecturer finds out from the feedback result that the audience cannot understand the speech very well, the user can add an explanation as necessary.

[Scene 3]

For example, it is assumed that a virtual store imitating a real store is constructed in the virtual space. In this case, the user uses an avatar to shop in the virtual store.

For example, it is assumed that an output image as in the example of FIG. 13 is displayed on the user terminal 200. In this case, the virtual space providing device estimates that the user pays attention to the product B and also estimates the user's emotion for the product B. As a result, the administrator of the virtual store can estimate which user has what kind of emotion for which product. That is, for example, the administrator can acquire the reaction of the customer (user) according to the content of the product, the description of the product, and the like. Therefore, the administrator can perform analysis for product improvement, review of sales methods, and the like based on the customer's reaction.

Example of Hardware Configuration of Virtual Space Providing Device

Figure 15:
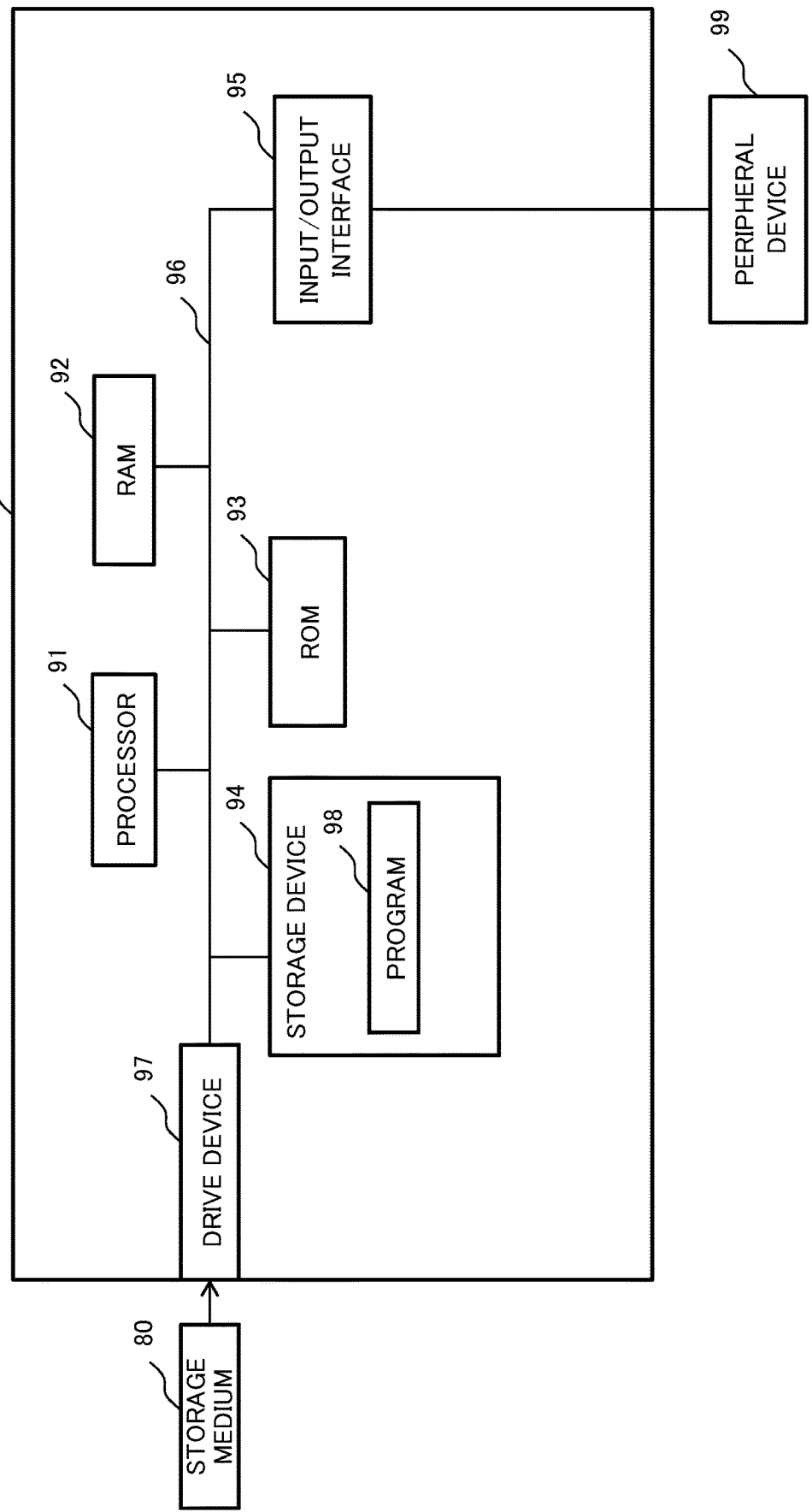
FIG. 15 is a block diagram illustrating an example of the hardware configuration of a computer device that implements the virtual space providing devices according to the first, second, third, and fourth example embodiments of the present disclosure.

Hardware forming the virtual space providing devices according to the first, second, third, and fourth example embodiments described above will be described. FIG. 15 is a block diagram illustrating an example of the hardware configuration of a computer device that implements the virtual space providing device according to each example embodiment. In a computer device 90, the virtual space providing device and the virtual space providing method described in each example embodiment and each modification example are implemented.

As illustrated in FIG. 15, the computer device 90 includes a processor 91, a random access memory (RAM) 92, a read only memory (ROM) 93, a storage device 94, an input/output interface 95, a bus 96, and a drive device 97. The virtual space providing device may be implemented by a plurality of electric circuits.

The storage device 94 stores a program (computer program) 98. The processor 91 executes the program 98 of the virtual space providing device using the RAM 92. Specifically, for example, the program 98 includes a program that causes a computer to execute the processing illustrated in FIGS. 4, 8, 11, and 14. When the processor 91 executes the program 98, the functions of the components of the virtual space providing device are enabled. The program 98 may be stored in the ROM 93. The program 98 may be recorded in the storage medium 80 and read using the drive device 97, or may be transmitted from an external device (not illustrated) to the computer device 90 through a network (not illustrated).

Through the input/output interface 95, data is transmitted to and received from a peripheral device 99 (a keyboard, a mouse, a display device, and the like). The input/output interface 95 functions as a means for acquiring or outputting data. The bus 96 connects the components to each other.

There are various modification examples of the method for implementing the virtual space providing device. For example, the virtual space providing device can be implemented as a dedicated device. The virtual space providing device can be implemented based on a combination of a plurality of devices.

A processing method in which a program for implementing each component in the function of each example embodiment is recorded in a storage medium and the program recorded in the storage medium is read as a code and executed in a computer is also included in the scope of each example embodiment. That is, a computer-readable storage medium is also included in the scope of each example embodiment. A storage medium in which the above-described program is recorded and the program itself are also included in each example embodiment.

The storage medium is, for example, a floppy (registered trademark) disk, a hard disk, an optical disk, a magneto-optical disk, a compact disc (CD)-ROM, a magnetic tape, a nonvolatile memory card, or a ROM, but is not limited to this example. The program recorded in the storage medium is not limited to a program that executes processing alone, and programs that operate on an operating system (OS) to execute processing in cooperation with other software and functions of an extension board are also included in the scope of each example embodiment.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The above-described example embodiments and modification examples can be appropriately combined.

Some or all of the above example embodiments may be described as the following supplementary notes, but are not limited to the following.

SUPPLEMENTARY NOTES

[Supplementary Note 1]
 A virtual space providing device, including:
  a detection means for detecting a direction of an avatar in a virtual space, the direction of which changes according to a user's operation;
  an output control means for performing control to output to the user an output image that is an image according to the direction of the avatar in the virtual space and in which a display mode of an outside of a predetermined range on the image has been changed; and
  an estimation means for estimating the user's line of sight based on the predetermined range of the output image.

[Supplementary Note 2]
 The virtual space providing device according to Supplementary Note 1,
  wherein the output control means performs control to output to the user the output image in which the outside of the predetermined range is blurred.

[Supplementary Note 3]
 The virtual space providing device according to Supplementary Note 1 or 2,
  wherein, when a plurality of objects are included in the predetermined range, the estimation means estimates that the user's line of sight is directed to an object closer to a center of the predetermined range.

[Supplementary Note 4]
 The virtual space providing device according to any one of Supplementary Notes 1 to 3,
  wherein, the output control means includes:
   an image generation means for generating, as the output image, an image from a viewpoint of the avatar in which the display mode of the outside of the predetermined range has been changed; and an image transmission means for transmitting the generated output image to a display device used by the user.

[Supplementary Note 5]

The virtual space providing device according to Supplementary Note 4,
wherein, when an object appears within a predetermined distance from a center of the predetermined range and the object appearing within the predetermined distance also appears outside the predetermined range, the image generation means generates the output image in which a display mode of a range not including the object appearing within the predetermined distance and outside the predetermined range has been changed.

[Supplementary Note 6]

The virtual space providing device according to any one of Supplementary Notes 1 to 5, further including:
a setting reception means for receiving setting of at least one of a position, a size, and a shape of the predetermined range.

[Supplementary Note 7]

The virtual space providing device according to any one of Supplementary Notes 1 to 6,
wherein, when a cursor indicated by the user operating a device is located inside the predetermined range, the estimation means estimates that the user is facing an object pointed to by the cursor.

[Supplementary Note 8]

The virtual space providing device according to any one of Supplementary Notes 1 to 7, further including:
an emotion estimation means for estimating the user's emotion for an object appearing in the predetermined range based on a captured image that is captured by an imaging device and in which the user appears.

[Supplementary Note 9]

The virtual space providing device according to Supplementary Note 8,
wherein the emotion estimation means adds information indicating the estimated user's emotion to the avatar operated by the user.

[Supplementary Note 10]

The virtual space providing device according to any one of Supplementary Notes 1 to 9,
wherein the predetermined range is a range including a center of the output image.

[Supplementary Note 11]

A virtual space providing method, including:
detecting a direction of an avatar in a virtual space, the direction of which changes according to a user's operation;
performing control to output to the user an output image that is an image according to the direction of the avatar in the virtual space and in which a display mode of an outside of a predetermined range on the image has been changed; and
estimating the user's line of sight based on the predetermined range of the output image.

[Supplementary Note 12]

The virtual space providing method according to Supplementary Note 11,
wherein, in the performing of control, the output image in which the outside of the predetermined range is blurred is controlled to be output to the user.

[Supplementary Note 13]

The virtual space providing method according to Supplementary Note 11 or 12,
wherein, in the estimating of the user's line of sight, when a plurality of objects are included in the predetermined range, it is estimated that the user's line of sight is directed to an object closer to a center of the predetermined range.

[Supplementary Note 14]

The virtual space providing method according to any one of Supplementary Notes 11 to 13,
wherein, the performing of control includes:
generating, as the output image, an image from a viewpoint of the avatar in which the display mode of the outside of the predetermined range has been changed; and
transmitting the generated output image to a display method device used by the user.

[Supplementary Note 15]

The virtual space providing method according to Supplementary Note 14,
wherein, in the generating, when an object appears within a predetermined distance from a center of the predetermined range and the object appearing within the predetermined distance also appears outside the predetermined range, the output image in which a display mode of a range not including the object appearing within the predetermined distance and outside the predetermined range has been changed is generated.

[Supplementary Note 16]

The virtual space providing method according to any one of Supplementary Notes 11 to 15, further including:
receiving setting of at least one of a position, a size, and a shape of the predetermined range.

[Supplementary Note 17]

The virtual space providing method according to any one of Supplementary Notes 11 to 16,
wherein, in the estimating of the user's line of sight, when a cursor indicated by the user operating a device is located inside the predetermined range, it is estimated that the user is facing an object pointed to by the cursor.

[Supplementary Note 18]

The virtual space providing method according to any one of Supplementary Notes 11 to 17, further including:
estimating the user's emotion for an object appearing in the predetermined range based on a captured image that is captured by an imaging device and in which the user appears.

[Supplementary Note 19]

The virtual space providing method according to Supplementary Note 18,
wherein, in the estimating of the user's emotion, information indicating the estimated user's emotion is added to the avatar operated by the user.

[Supplementary Note 20]

The virtual space providing method according to any one of Supplementary Notes 11 to 19,
wherein the predetermined range is a range including a center of the output image.

[Supplementary Note 21]

A computer-readable storage medium storing a program causing a computer to execute:
processing for detecting a direction of an avatar in a virtual space, the direction of which changes according to a user's operation;
processing for performing control to output to the user an output image that is an image according to the direction of the avatar in the virtual space and in which a display mode of an outside of a predetermined range on the image has been changed; and
processing for estimating the user's line of sight based on the predetermined range of the output image.

[Supplementary Note 22]
The computer-readable storage medium according to Supplementary Note 21,
wherein, in the processing for performing control, the output image in which the outside of the predetermined range is blurred is controlled to be output to the user.

[Supplementary Note 23]
The computer-readable storage medium according to Supplementary Note 21 or 22,
wherein, in the processing for estimating of the user's line of sight, when a plurality of objects are included in the predetermined range, it is estimated that the user's line of sight is directed to an object closer to a center of the predetermined range.

[Supplementary Note 24]
The computer-readable storage medium according to any one of Supplementary Notes 21 to 23,
wherein, the processing for performing control includes:
generating, as the output image, an image from a viewpoint of the avatar in which the display mode of the outside of the predetermined range has been changed; and
transmitting the generated output image to a display method used by the user.

[Supplementary Note 25]
The computer-readable storage medium according to Supplementary Note 24,
wherein, in the processing for generation, when an object appears within a predetermined distance from a center of the predetermined range and the object appearing within the predetermined distance also appears outside the predetermined range, the output image in which a display mode of a range not including the object appearing within the predetermined distance and outside the predetermined range has been changed is generated.

[Supplementary Note 26]
The computer-readable storage medium according to any one of Supplementary Notes 21 to 25, storing:
a program causing the computer to further execute processing for receiving setting of at least one of a position, a size, and a shape of the predetermined range.

[Supplementary Note 27]
The computer-readable storage medium according to any one of Supplementary Notes 21 to 26,
wherein, in the processing for estimating the user's line of sight, when a cursor indicated by the user operating a device is located inside the predetermined range, it is estimated that the user is facing an object pointed to by the cursor.

[Supplementary Note 28]
The computer-readable storage medium according to any one of Supplementary Notes 21 to 27, storing:
a program causing a computer to further execute processing for estimating the user's emotion for an object appearing in the predetermined range based on a captured image that is captured by an imaging device and in which the user appears.

[Supplementary Note 29]
The computer-readable storage medium according to Supplementary Note 28,
wherein, in the processing for estimating the user's emotion, information indicating the estimated user's emotion is added to the avatar operated by the user.

[Supplementary Note 30]
The computer-readable storage medium according to any one of Supplementary Notes 21 to 29,
wherein the predetermined range is a range including a center of the output image.

REFERENCE SIGNS LIST

100, 101, 102 virtual space providing device
110 detection unit
120 output control unit
121 image generation unit
122 image transmission unit
130, 131 estimation unit
140 setting reception unit
150 emotion estimation unit
200 user terminal

What is claimed is:

1. A virtual space providing device comprising:
one or more memories storing instructions; and
one or more processors configured to execute the instructions to:
detect a direction of an avatar in a virtual space, the direction of which changes according to an operation of a user;
control a display to output an image, according to the direction of the avatar in the virtual space, in which a first portion of the image that is outside of a predetermined range is changed to a different shade of color than a second portion of the image that is inside the predetermined range,
wherein the first portion of the image is changed to a lighter shade of color than the second portion of the image.

2. The virtual space providing device according to claim 1,
wherein the one or more processors are configured to execute the instructions to perform control to output to the user the image in which the outside of the predetermined range is blurred.

3. The virtual space providing device according to claim 1,
wherein, when a plurality of objects are included in the predetermined range, the one or more processors estimate that a line of sight of the user is directed to an object closer to a center of the predetermined range.

4. The virtual space providing device according to claim 1,
wherein the one or more processors are configured to further execute the instructions to:
generate, as the image, an image from a viewpoint of the avatar in which a display mode of the outside of the predetermined range has been changed; and
transmit the generated image to a display device used by the user.

5. The virtual space providing device according to claim 4,
wherein, when an object appears within a predetermined distance from a center of the predetermined range and the object appearing within the predetermined distance also appears outside the predetermined range, the one or more processors generate the image in which a display mode of a range not including the object appearing within the predetermined distance and outside the predetermined range has been changed.

6. The virtual space providing device according to claim 1
wherein the one or more processors are configured to further execute the instructions to receive setting of at least one of a position, a size, and a shape of the predetermined range.

7. The virtual space providing device according to claim 1,
wherein, when a cursor indicated by the user operating a device is located inside the predetermined range, the one or more processors estimate that the user is facing an object pointed to by the cursor.

8. The virtual space providing device according to claim 1
wherein the one or more processors are configured to further execute the instructions to estimate the user's emotion for an object appearing in the predetermined range based on a captured image that is captured by an imaging device and in which the user appears.

9. The virtual space providing device according to claim 1,
wherein the predetermined range is a range including a center of the image.

10. A virtual space providing method comprising:
by a computer,
detecting a direction of an avatar in a virtual space, the direction of which changes according to an operation of a user;
controlling a display to output an image, according to the direction of the avatar in the virtual space, in which a first portion of the image that is outside of a predetermined range is changed to a different shade of color than a second portion of the image that is inside the predetermined range,
wherein the first portion of the image is changed to a lighter shade of color than the second portion of the image.

11. The virtual space providing method according to claim 10,
wherein, in the performing of control, the image in which the outside of the predetermined range is blurred is controlled to be output to the user.

12. The virtual space providing method according to claim 10,
wherein, in the estimating of the user's line of sight, when a plurality of objects are included in the predetermined range, it is estimated that a line of sight of the user is directed to an object closer to a center of the predetermined range.

13. The virtual space providing method according to claim 10,
wherein, the performing of control includes:
generating, as the image, an image from a viewpoint of the avatar in which a display mode of the outside of the predetermined range has been changed; and
transmitting the generated image to a display device used by the user.

14. The virtual space providing method according to claim 13,
wherein, in the generating, when an object appears within a predetermined distance from a center of the predetermined range and the object appearing within the predetermined distance also appears outside the predetermined range, the image in which a display mode of a range not including the object appearing within the predetermined distance and outside the predetermined range has been changed is generated.

15. The virtual space providing method according to claim 10, further comprising:
receiving setting of at least one of a position, a size, and a shape of the predetermined range.

16. The virtual space providing method according to claim 10,
wherein, in the estimating of the user's line of sight, when a cursor indicated by the user operating a device is located inside the predetermined range, it is estimated that the user is facing an object pointed to by the cursor.

17. The virtual space providing method according to claim 10, further comprising:
estimating the user's emotion for an object appearing in the predetermined range based on a captured image that is captured by an imaging device and in which the user appears.

18. A non-transitory computer-readable storage medium storing a program causing a computer to execute:
processing for detecting a direction of an avatar in a virtual space, the direction of which changes according to an operation of a user;
processing for controlling a display to output an image, according to the direction of the avatar in the virtual space, in which a first portion of the image that is outside of a predetermined range is changed to a different shade of color than a second portion of the image that is inside the predetermined range,
wherein the first portion of the image is changed to a lighter shade of color than the second portion of the image.

* * * * *